(12) United States Patent
Ohara

(10) Patent No.: US 8,033,310 B2
(45) Date of Patent: Oct. 11, 2011

(54) PNEUMATIC TIRE WITH TREAD HAVING THIN GROOVE AND SACRIFICE LAND PORTION HAVING PROTRUDING PORTION

(75) Inventor: Masaaki Ohara, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 832 days.

(21) Appl. No.: 12/102,130

(22) Filed: Apr. 14, 2008

(65) Prior Publication Data

US 2008/0257468 A1    Oct. 23, 2008

(30) Foreign Application Priority Data

Apr. 20, 2007 (JP) ................................. 2007-111917

(51) Int. Cl.
*B60C 11/01* (2006.01)
*B60C 11/12* (2006.01)
(52) U.S. Cl. .......... 152/209.21; 152/209.27; 152/DIG. 3
(58) Field of Classification Search ............. 152/209.15, 152/209.18, 209.21, 209.27, DIG. 3
See application file for complete search history.

(56) References Cited

U.S. PATENT DOCUMENTS

| | | | | |
|---|---|---|---|---|
| 2,121,871 A | * | 6/1938 | Havens | 152/209.21 |
| 2,246,479 A | * | 6/1941 | Schrank | 152/209.18 |
| 3,095,024 A | * | 6/1963 | Robertson | 152/209.21 |
| 7,208,110 B2 | * | 4/2007 | Lopez et al. | 264/139 |
| 2003/0005992 A1 | | 1/2003 | Radulescu | |

FOREIGN PATENT DOCUMENTS

| | | | |
|---|---|---|---|
| EP | 0310301 | * | 5/1989 |
| JP | 03-007604 | * | 1/1991 |
| JP | 03-135804 | * | 6/1991 |
| JP | 2002-019420 | * | 1/2002 |
| JP | 2002-79809 | * | 3/2002 |
| JP | 2002-512575 | | 4/2002 |
| JP | 2005-343381 | * | 12/2005 |

\* cited by examiner

*Primary Examiner* — Steven D Maki
*Assistant Examiner* — Robert Dye
(74) *Attorney, Agent, or Firm* — Fish & Richardson P.C.

(57) ABSTRACT

A pneumatic tire comprising, on a tread face of the tire, a shoulder land portion extending in a circumferential direction of the tire, and a thin groove extending in the circumferential direction of the tire adjacent to a contact end of the shoulder land portion where comes into contact with the ground and segmenting the shoulder land portion into a main land portion located at the inner side thereof as viewed in the width direction of the tire and a sacrifice land portion located at the outer side thereof as viewed in the width direction of the tire, wherein the thin groove includes an enlarged portion extending in the circumferential direction of the tire in which a groove width thereof at groove bottom is enlarged toward the sacrifice land portion side only, and a protruding portion that protrudes toward the groove bottom side along the inner wall located at the sacrifice land portion side and extends in the circumferential direction of the tire.

1 Claim, 3 Drawing Sheets

PNEUMATIC TIRE WITH TREAD HAVING THIN GROOVE AND SACRIFICE LAND PORTION HAVING PROTRUDING PORTION

BACKGROUND OF THE INVENTION

1. Field of the Invention

The present invention relates to a pneumatic tire comprising, on a tread face of the tire, a shoulder land portion extending in a circumferential direction of the tire, and a thin groove extending in the circumferential direction of the tire adjacent to a contact end of the shoulder land portion where comes into contact with the ground and segmenting the shoulder land portion into a main land portion located at the inner side thereof as viewed in the width direction of the tire and a sacrifice land portion located at the outer side thereof as viewed in the width direction of the tire.

2. Description of the Related Art

Conventionally, in order to prevent irregular wear of tires, it is widely took measures that a tire is formed, on a tread surface, with a thin groove that extends in the circumferential direction of the tire adjacent to a contact end of the shoulder land portion where comes into contact with the ground. However, when the tire receives a force from a road surface during running and when a sacrifice land portion thereof is deformed excessively, this causes stress convergence at the bottom of the groove and thereby results in cracks. Thus, conventional tires have had a problem in the aspect of the durability thereof.

Such cracks are easily generated at the groove bottom of a tire in a situation as described below. That is, for example, as shown in FIG. 5, such cracks are easily generated at the groove bottom of the tire particularly in the case where a sacrifice land portion 11 of the tire runs on the step 10 and is deformed excessively and the bottom of a thin groove 12 receives a force in a direction indicated with the arrowheads when a vehicle runs along a step 10 extending along a road shoulder in the vehicle's travel direction. In the situation mentioned hereinbefore, if the sacrifice land portion 11 of the tire is formed to be thinner, even when the sacrifice land portion 11 is deformed, the stress hardly affects on the groove bottom and cracks are hardly generated. However, in this case, there arises such a problem that the sacrifice land portion 11 itself is broken away or the preventive effect against the irregular wear of the tire is reduced.

As a measure to prevent a crack generation in the thin groove, for example, Japanese Published Patent Publication No. 2002-512575 discloses a technique such that, in order to increase the curvature radius at the groove bottom, the thin groove is formed, in the groove bottom, with an enlarged portion at the sacrifice land portion side to thereby prevent generation of cracks in the groove bottom.

However, for example, even when the curvature radius at the groove bottom is increased by forming an enlarged portion 16 in a thin groove 15 as shown in FIG. 3, in the case where the tire receives a lateral force and the thin groove 15 is deformed in a direction that the thin groove is squashed as shown in FIG. 4, the curvature radius at the groove bottom is not ensured. As a result, the crack generation cannot be satisfactorily prevented. In order to increase the preventive effect against the crack generation in the groove bottom, when the curvature radius of the enlarged portion 16 is further increased, a cavity of the enlarged portion 16 at the sacrifice land portion 14 side is inevitably enlarged. As a result, the rigidity of the sacrifice land portion 14 cannot be ensured. Therefore, there is a limitation for increasing the curvature radius at the groove bottom of the thin groove 15.

SUMMARY OF THE INVENTION

The present invention has been made in view of the above described circumstances. An object of the present invention is to provide a pneumatic tire capable of effectively preventing the generation of cracks at the groove bottom of thin groove while ensuring its irregular wear proof performance.

The above described object can be achieved by the present invention as follows. That is, the present invention provides a pneumatic tire comprising, on a tread face of the tire, a shoulder land portion extending in a circumferential direction of the tire, and a thin groove extending in the circumferential direction of the tire adjacent to a contact end of the shoulder land portion where comes into contact with the ground and segmenting the shoulder land portion into a main land portion located at the inner side thereof as viewed in the width direction of the tire and a sacrifice land portion located at the outer side thereof as viewed in the width direction of the tire, wherein the thin groove includes an enlarged portion extending in the circumferential direction of the tire in which a groove width thereof at groove bottom is enlarged toward the sacrifice land portion side only, and a protruding portion that protrudes toward the groove bottom side along the inner wall located at the sacrifice land portion side and extends in the circumferential direction of the tire.

According to the present invention, the thin groove includes the enlarged portion extending in the circumferential direction of the tire, in which the groove width at the groove bottom is enlarged toward the sacrifice land portion side only. With this arrangement, the generation of cracks in the groove bottom can be prevented and the rigidity of the main land portion can be satisfactorily ensured. Even when the sacrifice land portion receives a force from a road surface and is tilted onto the main land portion, the main land portion is prevented from being deformed, and thus the irregular wear thereof can be prevented. Further, the thin groove includes the protruding portion that protrudes toward the groove bottom side along the inner wall located at the sacrifice land portion side and extends in the circumferential direction of the tire. Therefore, even when the thin groove is deformed in a direction that the thin groove is squashed particularly upon receiving a lateral force, the protruding portion comes into contact with the inner wall located at the main land portion side first and supports the enlarged portion, so that the enlarged portion is prevented from being squashed completely. With this arrangement, the curvature radius at the groove bottom is ensured a certain extent, and thus the generation of cracks in the groove bottom can be effectively prevented. As a result, the pneumatic tire of the present invention can ensure both of the irregular wear proof performance and the crack proof performance at the groove bottom of the thin groove.

In the pneumatic tire mentioned hereinbefore, it is preferable that the protruding portion has a front end portion having a circular shape in section, and when defining a maximum groove width of the enlarged portion as W and a maximum width of the protruding portion as W1, the relationship therebetween is $0.25 \leqq W1/W \leqq 0.65$. According to the above arrangement, since the width of the protruding portion is optimally ensured, the enlarged portion can be effectively prevented from being squashed and the curvature radius at the groove bottom can be ensured. Accordingly, the generation of cracks in the groove bottom can be prevented further effectively.

DETAILED DESCRIPTION OF THE PREFERRED EMBODIMENTS

Figure 1:
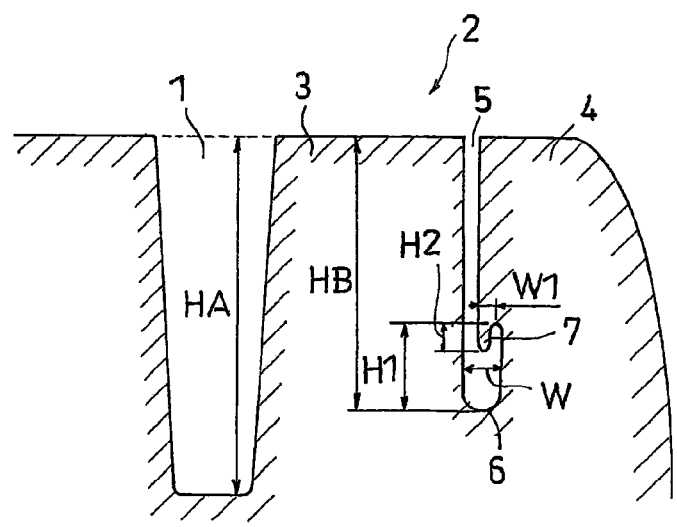
FIG. 1 is a sectional view, taken along a meridian of a tire, of a shoulder land portion of a pneumatic tire according to the present invention.

Hereinafter, an embodiment of the present invention will be described with reference to the accompanying drawings. FIG. 1 is a sectional view, taken along a meridian of a tire, of a shoulder land portion of a pneumatic tire according to the present invention.

The pneumatic tire according to the present embodiment has a tread face including a shoulder land portion 2 that extends in the circumferential direction of the tire as shown in FIG. 1. The shoulder land portion 2 is located at the outer side of a main groove 1 located at the outermost side as viewed in a width direction of the tire in a plurality of main grooves extending in the circumferential direction of the tire. The shoulder land portion 2 includes a main land portion 3 located at the inner side of the shoulder land portion 2 as viewed in the width direction of the tire and a sacrifice land portion 4 located at the outer side thereof as viewed in the width direction of the tire and the shoulder land portion 2 is segmented away from each other by a thin groove 5. The thin groove 5 extends in the circumferential direction of the tire adjacent to a contact end of the shoulder land portion 2 where comes into contact with the ground. The ratio HB/HA of a groove depth HB of the thin groove 5 with respect to the groove depth HA of the main groove 1 is not particularly limited, but may be arranged to be 0.80 to 1.10.

The tread pattern of the pneumatic tire according to the present invention is applicable, without being particularly limited, to any pneumatic tire of a rib type, a block type, a lug type or the like. Also, there is no particular limitation on the shoulder land portion 2. The thin groove 5 is preferably formed in an area within 5% of a tread width, from the contact end of tread face of the tire, that comes into contact with the ground since the irregular wear is effectively prevented.

The thin groove 5 includes an enlarged portion 6 that extends in the circumferential direction of the tire, in which the groove width at the groove bottom is enlarged only toward the sacrifice land portion 4 side. With this arrangement, the generation of cracks at the groove bottom can be prevented as well as the rigidity of the main land portion 3 can be satisfactorily ensured. Accordingly, even when the sacrifice land portion 4 receives a force from a road surface and is tilted onto the main land portion 3, the main land portion 3 can be prevented from being deformed and thus prevented form suffering the irregular wear.

Contrarily, when the groove width of the thin groove 5 at the groove bottom is arranged to be enlarged toward the main land portion 3 side and the thin groove 5 extends in the circumferential direction of the tire, the rigidity of the main land portion 3 decreases. As a result, when the sacrifice land portion 4 receives a force from a road surface and is tilted onto the main land portion 3, the main land portion 3 is easily deformed and the preventive effect against the irregular wear is reduced.

Figure 2:
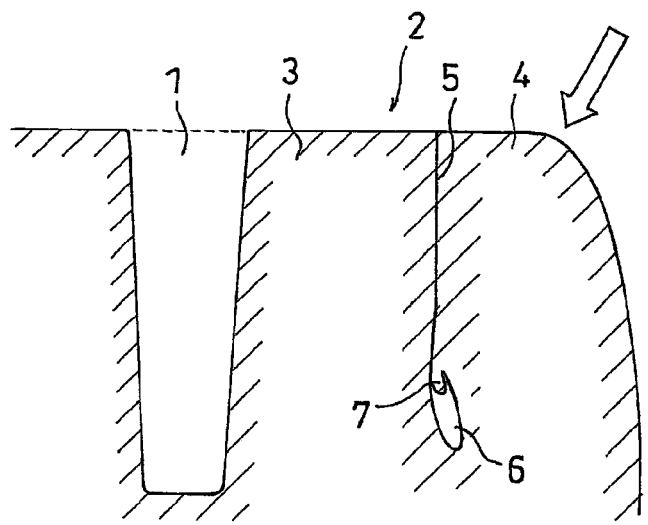
FIG. 2 is a sectional view, taken along a meridian of a tire, of a shoulder land portion of a pneumatic tire according to the present invention when the tire receives a lateral force.

Further, the thin groove 5 includes a protruding portion 7 that protrudes toward the groove bottom side along the inner wall at the side of the sacrifice land portion 4 and extends in the circumferential direction of the tire. With this arrangement, particularly when the tire receives a lateral force and the thin groove 5 is deformed in a direction that, for example, the thin groove 5 is squashed as shown in FIG. 2, the protruding portion 7 comes into contact with the inner wall of the main land portion 3 side first and support the enlarged portion 6. Accordingly, the enlarged portion 6 can be prevented from being squashed completely. Contrarily, in the case where a protruding portion, which protrudes toward the tread face side and extends in the circumferential direction of the tire, is disposed in the enlarged portion at the groove bottom, since the curvature radius at the groove bottom is reduced, the crack generation at the groove bottom cannot be prevented.

In the above arrangement, the protruding portion 7 has a front end portion having a circular shape in section. And when defining the maximum groove width of the enlarged portion 6 as W; and defining the maximum width of the protruding portion 7 as W1, the relationship therebetween is preferably arranged to be $0.25 \leq W1/W \leq 0.65$. With this arrangement, the width of the protruding portion 7 is appropriately ensured and the enlarged portion 6 can be effectively prevented from being squashed. Accordingly, the curvature radius at the groove bottom can be satisfactorily ensured. Thus, the generation of cracks at the groove bottom can be prevented further effectively. Furthermore, it is preferable that the relationship between the maximum groove width W of the enlarged portion 6 and the maximum width W1 of the protruding portion 7 is arranged to be $0.30 \leq W1/W \leq 0.65$, since the above described operational advantage is effectively exhibited.

In order to prevent the enlarged portion 6 in the groove bottom from being squashed completely, the maximum width W1 of the protruding portion 7 is preferably arranged to be 1.0 mm to 2.5 mm. Furthermore, the ratio H1/H2 of the maximum height H2 of the protruding portion 7 in a normal line direction of the tire with respect to the maximum height H1 of the enlarged portion 6 in the normal line direction of the tire is preferably arranged to be $1.30 \leq H1/H2 \leq 2.20$. With this arrangement, even when the tire receives a lateral force and the thin groove 5 is deformed in a direction that the thin groove 5 is squashed, the enlarged portion 6 in the groove bottom is optimally prevented from being squashed completely. Accordingly, the generation of cracks at the groove bottom can be prevented further effectively. In order to effectively prevent the generation of cracks at the groove bottom, it is preferable that the maximum groove width W of the enlarged portion 6 is arranged to be 2.5 mm to 5.0 mm.

It should be noted that the above described dimensional values of the respective portions such as the maximum groove width W, the maximum width W1 and the ratios therebetween were measured under the conditions that the tire was filled with air at proper inner pressure with no load. The proper inner pressure is the air pressure that the relevant standards prescribe for each tire in a standard system including the standard to which the tire conforms; i.e., in the JATMA, the maximum air pressure; in the TRA, the maximum value set forth in a table "TIRE LOAD LIMITS AT VARIOUS COLD INFLATION PRESSURES"; and in the ETRTO, "INFLATION PRESSURE".

The pneumatic tire of the present invention is the same as conventional pneumatic tire excepting the point that the thin groove is, as described above, formed in the shoulder land portion. Any of conventionally known materials, configurations, structures, manufacturing processes and the like may be applied to the present invention. The pneumatic tire having the thin groove 5 can be manufactured by using molding dies having a projection stripe of a configuration corresponding to, for example, the enlarged portion 6 and the protruding portion 7. In such manufacturing process, since the sacrifice land portion 4 deforms elastically when removing tire from the dies after curing thereof, so that there is no problem in the manufacturing processes.

EXAMPLES

Hereinafter, Examples demonstrating the constitution and effect of the present invention will be described. Evaluation items and measurement methods carried out on Examples and Comparative Examples are as described below.

(1) Irregular Wear Proof Performance

Test tires were mounted on the front wheel of a tractor head. Amount of irregular wear was measured and evaluation was made after running 150,000 miles (240,000 km) on a dry road surface under the following conditions: i.e., inner pressure: 760 kPa, load: 2800 kgf. The criteria were as described below.
A: No irregular wear was found
B: Slight irregular wear was found but replacement was not needed
C: Heavy irregular wear was found and replacement was needed (2) Groove Bottom Crack Proof Performance After completing the test (1), cracks at the groove bottom were visually checked for and an evaluation was made. The criteria were as described below.
A: No crack was found after running 150,000 miles
B: Allowable cracks were found after running 150,000 miles
C: Cracks were found after running 100,000 miles

Comparative Example 1

Figure 3:
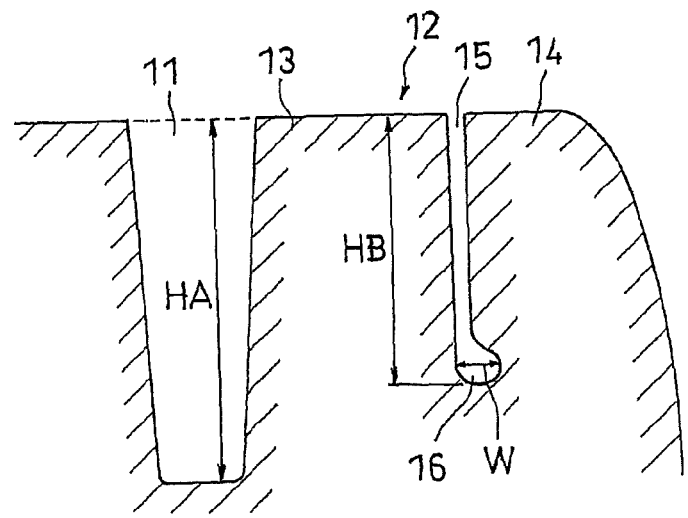
FIG. 3 is a sectional view, taken along a meridian of a tire, of a shoulder land portion of a conventional pneumatic tire.
Figure 4:
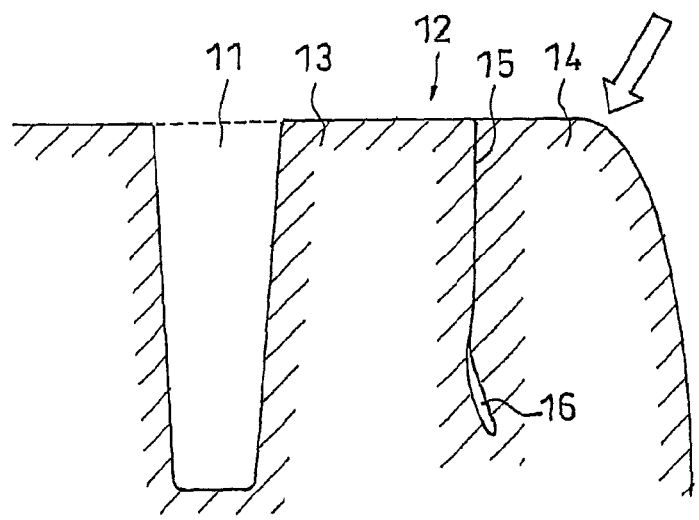
FIG. 4 is a sectional view, taken along a meridian of a tire, of a shoulder land portion of a conventional pneumatic tire when the tire receives a lateral force.
Figure 5:
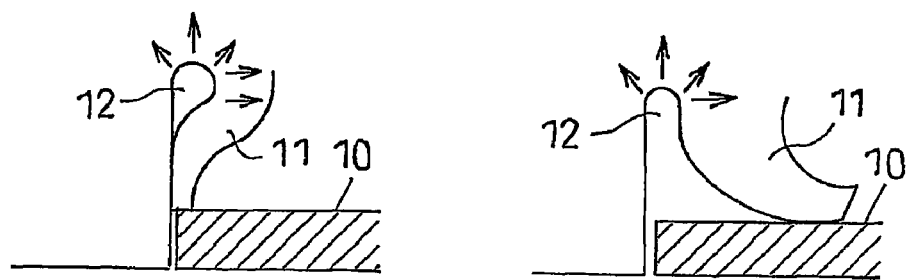
FIG. 5 is a sectional view, taken along a meridian of a tire, of a shoulder land portion of a pneumatic tire when a sacrifice land portion of the tire is deformed excessively.

A pneumatic tire (size 295/75 R22.5) with the thin groove 15 shown in FIG. 3 and formed in the shoulder land portion 12 is prepared. The above described evaluations were carried out. Here, the depth HA of the main groove 11 was 14.7 mm; the depth HB of the thin groove 15 was 14.9 mm; and the maximum groove width W of the enlarged portion 16 was 3.0 mm.

Comparative Example 2

A pneumatic tire formed with the thin groove 15, shown in FIG. 3, in the shoulder land portion 12, which has the same arrangement of the tread pattern and the thin groove 15 as that of Comparative Example 1 excepting a point that the maximum groove width W of the enlarged portion 16 was changed to 7.0 mm is prepared. The above described evaluations were carried out.

Examples 1 and 2

Pneumatic tires (size: 295/75 R22.5) formed with the thin groove 5 shown in FIG. 1 in the shoulder land portion 2, which have the same tread pattern as the pneumatic tire of the comparative Example 1 excepting the thin groove 15, wherein the maximum width W1 of the protruding portion 7, the maximum groove width W of the enlarged portion 6, the maximum height H1 of the enlarged portion 6 in the normal line direction of the tire, and the maximum height H2 of the protruding portion 7 in the normal line direction of the tire were set to the values listed in Table 1, were prepared. The above described evaluations were carried out. The depth HA of the main groove 1 was 14.7 mm; and the depth HB of the thin groove 5 was 14.9 mm. The results are shown in Table 1.

TABLE 1

|  | Comparative Example 1 | Comparative Example 2 | Example 1 | Example 2 |
|---|---|---|---|---|
| W1(mm) | — | — | 1.0 | 2.5 |
| W(mm) | 3.0 | 7.0 | 3.0 | 4.0 |
| W1/W | — | — | 0.33 | 0.625 |
| H1(mm) | — | — | 2.5 | 4.5 |
| H2(mm) | — | — | 1.15 | 2.5 |
| Irregular wear proof performance | A | C | A | A |
| Groove bottom crack proof performance | C | B | A | A |

The results shown in Table 1 demonstrate that, the pneumatic tires of Examples 1 and 2 ensure satisfactory characteristic in irregular wear proof performance, and the groove bottom crack proof performance thereof is also extremely excellent. On the other hand, the pneumatic tire of Comparative Example 1 exhibits the irregular wear proof performance equivalent to that of the pneumatic tire of Examples 1 and 2, but the groove bottom crack proof performance is inferior to Examples 1 and 2. In the pneumatic tire of Comparative Example 2, the groove bottom crack proof performance is improved compared to the pneumatic tire of Comparative Example 1, but the groove bottom crack proof performance is inferior to Examples 1 and 2; and the irregular wear proof performance is largely inferior to Examples 1 and 2.

What is claimed is:

1. A pneumatic tire comprising, on a tread face of the tire,
a shoulder land portion extending in a circumferential direction of the tire, and
a thin groove extending in the circumferential direction of the tire adjacent to a ground contact end of the shoulder land portion and segmenting the shoulder land portion into a main land portion located at the inner side thereof as viewed in the width direction of the tire and a sacrifice land portion located at the outer side thereof as viewed in the width direction of the tire, wherein
the thin groove includes an enlarged portion extending in the circumferential direction of the tire in which a groove width thereof at groove bottom is enlarged toward the sacrifice land portion side only, and the sacrifice land portion includes a protruding portion that protrudes toward the groove bottom side along the thin groove located at the sacrifice land portion side and extends in the circumferential direction of the tire, and
the protruding portion has a front end portion having a circular shape in section, and when defining a maximum groove width of the enlarged portion as W and a maximum width of the protruding portion as W1, the relationship therebetween is $0.25 \leqq W1/W \leqq 0.65$.

* * * * *